Jan. 6, 1959   D. M. LUTZE   2,867,164
DEEP FAT FRIER
Filed July 19, 1957   2 Sheets-Sheet 1
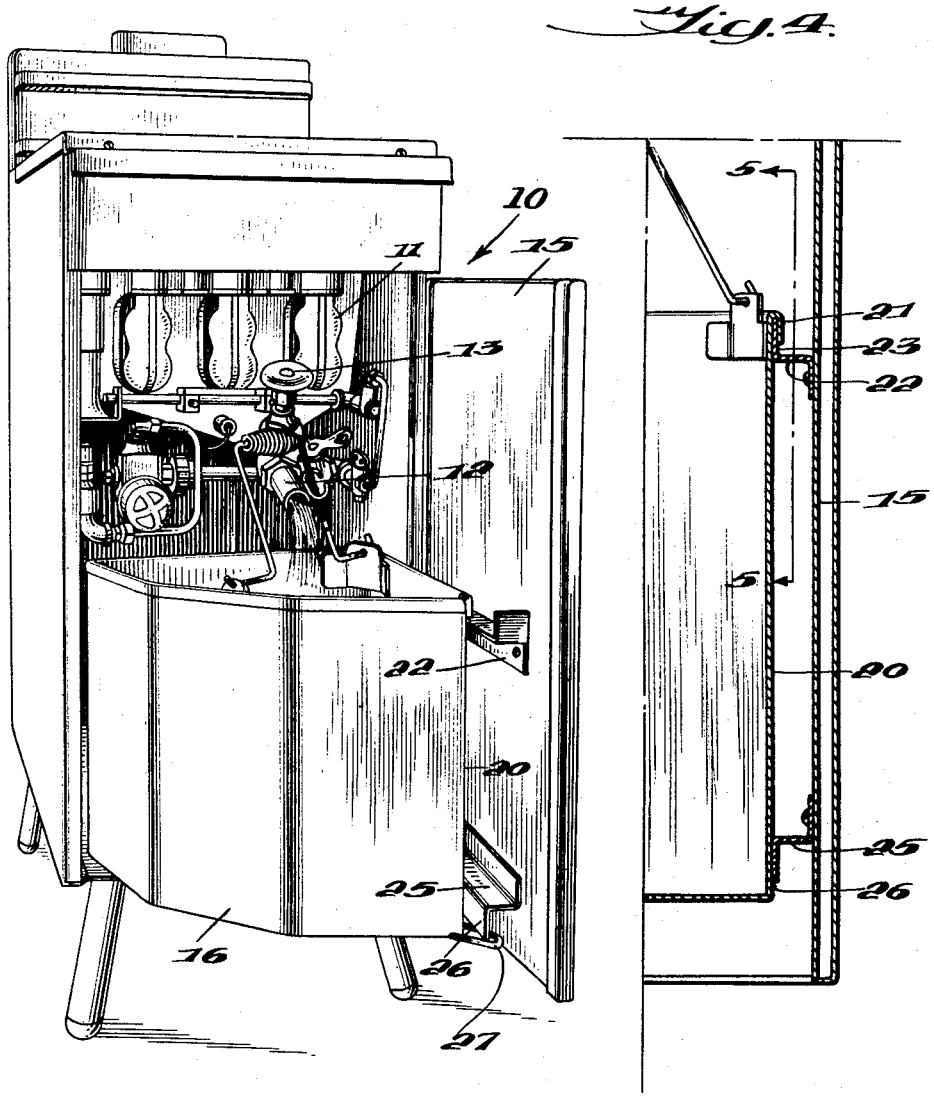
INVENTOR
Donald M. Lutze
BY Don T. Hatfield
ATTORNEY Jan. 6, 1959     D. M. LUTZE     2,867,164
DEEP FAT FRIER
Filed July 19, 1957     2 Sheets-Sheet 2
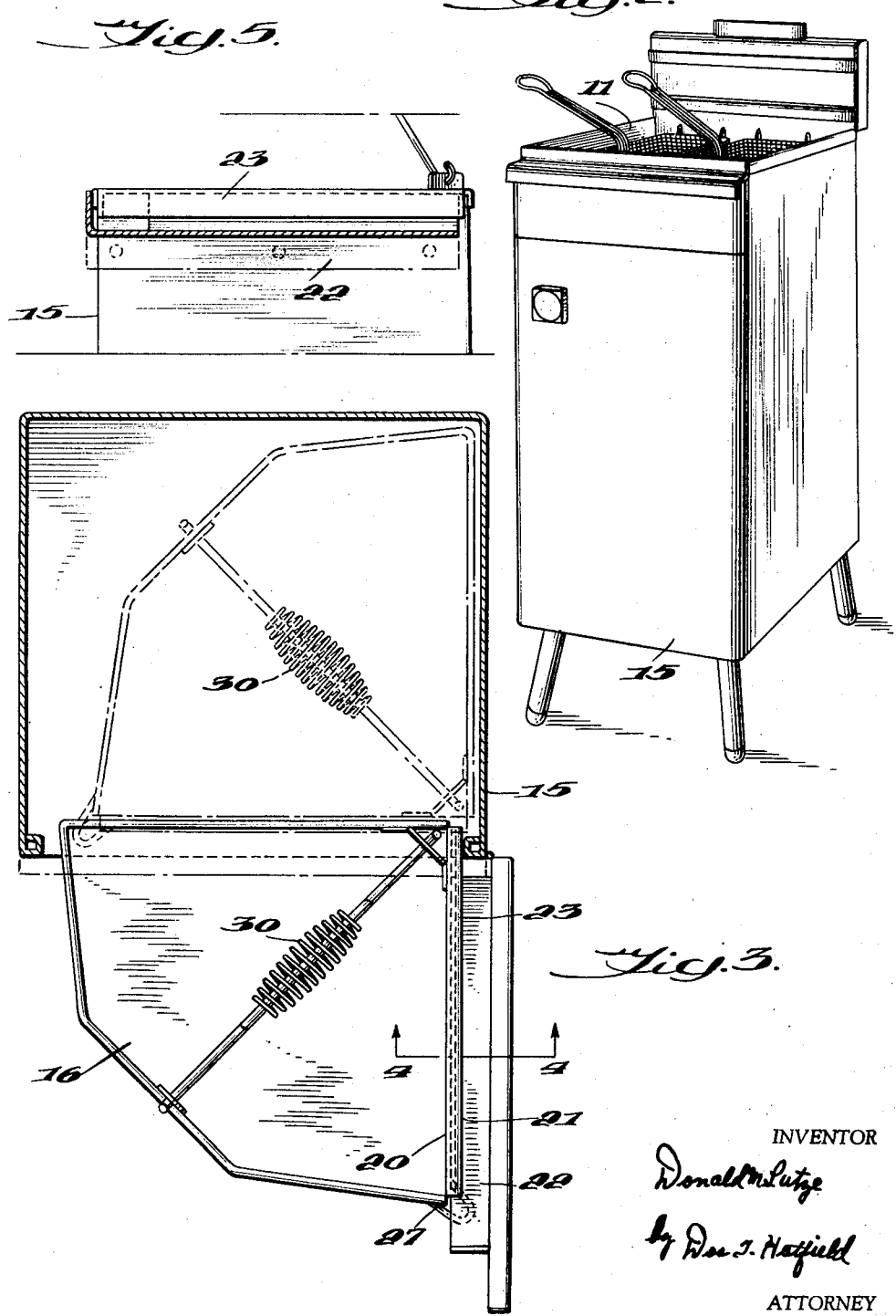
INVENTOR
Donald M. Lutze
by Dee J. Hatfield
ATTORNEY United States Patent Office 2,867,164
Patented Jan. 6, 1959

2,867,164

DEEP FAT FRIER

Donald M. Lutze, Concord, N. H., assignor to J. C. Pitman & Sons, Inc., Concord, N. H., a corporation of New Hampshire Application July 19, 1957, Serial No. 672,933

4 Claims. (Cl. 99—403)

The present invention relates to cooking apparatus and more particularly to an improved deep fat fryer.

A problem in the deep fat frying of foods is encountered in the handling and disposal of the used fat. As is well known, the most tasteful preparation of deep fried foods requires the frequent replacement of the used melted fat before the fat becomes rancid or contaminated with odors, flavors or food particles of an undesired nature. Often the used fat must be removed and replaced with new fat at a time when it is inconvenient to remove the fat from the immediate vicinity of the frying apparatus and therefore a problem of temporarily storing the removed used fat in a safe manner is thereby created.

It is a principal object of the present invention to provide an improved deep fat frier having means to facilitate the removal and replacement of used fat.

Another object of the invention is to provide an improved deep fat frier having means to temporarily store in a safe manner the used fat after removal from the frying well.

According to the invention a cabinet type of deep fat frier is provided with a simplified arrangement to drain used fat from the frying well into a used fat receptacle together with means to temporarily store the used fat receptacle within the cabinet of the frying apparatus. To this end, the cabinet is provided with a hinged front door having supporting structures arranged to removably support the used fat receptacle in a manner to position the receptacle within the cabinet structure for temporary storage when the door is closed and without the cabinet for easy removal of the receptacle when the door is opened. A used fat drain cock for the frying well is so arranged as to permit the discharge of the used fat directly into the receptacle when the door is opened and the receptacle is supported thereon.

Further objects, features and the attending advantages of the invention will be apparent with reference to the following specification and drawings in which:

Figure 1 is a front elevation of the deep fat frier of the invention with the cabinet door open and the waste fat receptacle supported thereon;

Figure 2 is a view similar to Fig. 1 but with the cabinet door in the closed position;

Figure 3 is a fragmentary sectional view on the line 3—3 of Figure 1 but omitting the details of the frying well;

Figure 4 is a fragmentary sectional view on the line 4—4 of Figure 3, and

Figure 5 is a fragmentary sectional view on the line 5—5 of Figure 4.

Referring to Figures 1 and 2 of the drawings, a cabinet, generally shown at 10, is arranged to support in any suitable manner within its upper portions a deep fat frying well 11. As more clearly shown in Fig. 2 of the drawings, the top surface of the cabinet is open to expose the interior of the frying well so that baskets of food to be cooked may be immersed in the heated and melted fat. The details of construction of the deep fat frying well and the heating apparatus and controls therefor form no part of this invention and may be conventional. However, it will be seen by a study of Figure 1 that these details are contained within the cabinet 10 immediately around and beneath the frying well. Attention is called to the drain cock 12 and valve handle 13 therefor which are so positioned beneath the well 11 as to discharge all of the used fat from the well when the valve handle 13 is manipulated to open the cock.

According to the invention, the cabinet 10 is provided with a front door 15 which may be hinged in any suitable manner (not shown in detail) to swing open on a vertical pivot at one side of the cabinet from a closed position as shown by Figure 2 to an open position as shown by Figure 1 of the drawings. A used fat receptacle 16 is arranged to be removably supported from the rear surface of the door 15 and the arrangement is such that when the door is closed, the receptacle 16 is contained entirely within the cabinet 10 in the space provided therefor beneath the frying well 11 as shown by the dotted lines of Figure 3 of the drawings. It will be noted that when the door 15 is open as shown by Figure 1 of the drawings, the drain cock 12 can discharge used fat from the frying well 11 directly into the receptacle 16. This operation to drain and replace the used fat in the well 11 may be done very quickly and the door 15 may thereafter be closed to temporarily store the used fat in the receptacle 16 in a safe manner within the cabinet 10.

The details of one preferred arrangement for removably supporting the used fat receptacle from the inner surface of the door 15 are believed to be most clearly shown by Figures 3, 4 and 5 of the drawings. The used fat receptacle 16 which may be of any suitable general configuration but is shown to have a generally triangular cross-section is provided with one side wall 20 to be positioned in generally parallel relation to the rear surface of the cabinet door 15 when supported therefrom. The upper edge of the receptacle side wall 20 is folded downward to form a hook supporting structure as shown at 21. Secured along an upper portion of the inner surface of the door 15 is a horizontally mounted bracket 22 having a vertically extending flange 23 over which the hook portion 21 of the receptacle 16 may be engaged. Thus the receptacle is supported from the back surface of the cabinet door 15 but may be slidably moved along the bracket 22 or lifted out of engagement with the flange 23 of the bracket in a manner to be later described in detail.

A brace member 23 is secured along the lower portion of the inner surface of the door 15 and is provided with an abutting flange surface 26 adapted to space the side wall 20 of the used fat receptacle 16 from the inner surface of the door 15 when supported therefrom. A projection 27 is secured to the bottom of the receptacle 16 in a manner to engage the under surface of the brace member 25 and normally prevent the lifting of the receptacle to free the supporting hook and flange structures 21 and 23. When it is desired to remove the used fat receptacle, the receptacle handle 30 is grasped and the receptacle is first moved horizontally along the supporting flange surface 21 until the projection 27 is moved from under the brace 25. Thereafter the used fat receptacle 16 may be lifted out of engagement from the cabinet door structure and carried to a disposal area.

While a particular arrangement for removably supporting the used fat receptacle from the inner surface of the cabinet door has been shown and described it should be understood that various other detailed arrangements may be used within the spirit of the invention and the scope of the appended claims.

What is claimed is:

1. A deep fat frier comprising, a cabinet, a frying well adapted to contain melted fat, means to mount said well in the upper part of said cabinet, a used fat drain cock secured to the lower portion of said well, a swingably hinged door for said cabinet, a used fat receptacle, and means to removably support said receptacle on the inner surface of said door to be swingable therewith and in a manner to position the receptacle within the cabinet beneath said well when said door is closed and without said cabinet when said door is open, said drain cock being positioned, relative to said well and receptacle, to discharge used fat into said receptacle when said door is open, said means to removably support the receptacle comprising a bracket mounted on the upper inner side of said door having a portion thereof positioned in spaced relation to the inner surface of said door, and one upper horizontal edge of said receptacle having a hook for engaging said bracket portion.

2. A deep fat frier comprising, a cabinet, a frying well adapted to contain melted fat, means to mount said well in said cabinet, a used fat drain cock for said well, a hinged door for said cabinet, a used fat receptacle, and means to removably support said receptacle on the inner surface of said door in a manner to position the receptacle within the cabinet when said door is closed and without said cabinet when said door is open, said means to removably support the receptacle comprising a bracket mounted on the upper inner surface of said door with a flange surface horizontally positioned and extending in a vertical plane, and one upper horizontal edge of said receptacle being folded downward to form a hooking surface for engaging said flange in removable supporting relation for said receptacle.

3. A deep fat frier comprising, a cabinet, a frying well adapted to contain melted fat, means to mount said well in said cabinet, a used fat drain cock for said well, a hinged door for said cabinet, a used fat receptable, and means to removably support said receptacle on the inner surface of said door in a manner to position the receptacle within the cabinet when said door is closed and without said cabinet when said door is open, said means to removably support the receptacle comprising a bracket mounted on the upper inner surface of said door with a flange surface horizontally positioned and extending in a vertical plane, one upper horizontal edge of said receptacle being folded downward to form a hooking surface for engaging said flange in removable supporting relation for said receptacle, and a lower brace member secured to said door beneath said bracket to engage the lower portion of a side wall of said receptacle and space the receptacle away from the inner door surface.

4. A deep fat frier comprising, a cabinet, a frying well adapted to contain melted fat, means to mount said well in said cabinet, a used fat drain cock for said well, a hinged door for said cabinet, a used fat receptacle, and means to removably support said receptacle on the inner surface of said door in a manner to position the receptacle within the cabinet when said door is closed and without said cabinet when said door is open, said means to removably support the receptacle comprising a bracket mounted on the upper inner surface of said door with a flange surface horizontally positioned and extending in a vertical plane, one upper horizontal edge of said receptacle being folded downward to form a hooking surface for engaging said flange in removable supporting relation for said receptacle, a lower brace member secured to said door beneath said bracket to engage the lower portion of a side wall of said receptacle and space the receptacle away from the inner door surface, and stop means carried by said receptacle to engage the lower surface of said brace means in a manner to prevent the upward movement of said receptacle to thereby disengage the hooking and flange surfaces unless said receptacle is first moved horizontally along said supporting flange surface to bring said stop member out from under the lower surface of said brace member.

References Cited in the file of this patent

UNITED STATES PATENTS 2,805,314   Michaelis _____ Sept. 3, 1957